United States Patent
Jong et al.

(10) Patent No.: US 7,870,413 B2
(45) Date of Patent: Jan. 11, 2011

(54) SYNCHRONIZATION CLOCKING SCHEME FOR SMALL SCALABLE MULTI-PROCESSOR SYSTEM

(75) Inventors: Jyh Ming Jong, Fremont, CA (US); Tomonori Hirai, Fremont, CA (US)

(73) Assignee: Mitac International Corp., Taoyuan (TW)

( * ) Notice: Subject to any disclaimer, the term of this patent is extended or adjusted under 35 U.S.C. 154(b) by 855 days.

(21) Appl. No.: 11/773,568

(22) Filed: Jul. 5, 2007

(65) Prior Publication Data

US 2008/0046770 A1 Feb. 21, 2008

Related U.S. Application Data

(60) Provisional application No. 60/822,498, filed on Aug. 15, 2006.

(51) Int. Cl.
*G06F 1/00* (2006.01)

(52) U.S. Cl. .................................................. 713/500

(58) Field of Classification Search ............. 713/500, 713/600
See application file for complete search history.

(56) References Cited

U.S. PATENT DOCUMENTS

| | | | | |
|---|---|---|---|---|
| 5,745,763 | A * | 4/1998 | Mealey et al. ............... | 719/321 |
| 5,764,965 | A * | 6/1998 | Poimboeuf et al. ........... | 713/400 |
| 6,464,540 | B1 * | 10/2002 | Sato ............................ | 439/668 |
| 7,043,655 | B2 * | 5/2006 | Wu .............................. | 713/501 |
| 7,124,071 | B2 * | 10/2006 | Rich et al. ..................... | 703/16 |
| 7,171,568 | B2 * | 1/2007 | Dayan et al. ................. | 713/300 |
| 7,418,541 | B2 * | 8/2008 | Fields et al. ................. | 711/100 |
| 2003/0200073 | A1 * | 10/2003 | Rich et al. ..................... | 703/17 |
| 2006/0129585 | A1 * | 6/2006 | Ishiki et al. .................. | 707/101 |

* cited by examiner

*Primary Examiner*—Thomas Lee
*Assistant Examiner*—Mohammed H Rehman

(57) ABSTRACT

A clocking scheme is provided to synchronize system clock across plural independent SMP (Symmetric Multi-Processing) domains of the multi-processor system. Each of the SMP domains is connected with another through an interconnection board and two or more identical connectors. The clocking scheme includes a clock source, a SPLL (Select Phase-Locked Loop) and a clock buffer on each of the SMP domains to provide a dedicated base clock. A self-clock path is used to send the base clock from the clock source to the SPLL on the same SMP domain, and on the other hand one or more base clock is sent through a distribution-clock path to another SPLL. The distribution-clock path and the self-clock path will have equal lengths, making the base clock pass through the two connectors or the same connector twice to achieve the similar electrical characteristics and balance the skew or propagation delay.

20 Claims, 5 Drawing Sheets

SYNCHRONIZATION CLOCKING SCHEME FOR SMALL SCALABLE MULTI-PROCESSOR SYSTEM

CROSS-REFERENCES TO RELATED APPLICATIONS

This application is a non-provisional application of the U.S. provisional application Ser. No. 60/822,498 to Jong, Jyh Ming and Tomonori Hirai, entitled "Synchronization Clocking Scheme For Small Scale Multi Processor System" filed on Aug. 15, 2006.

FIELD OF INVENTION

The present invention relates to the clocking scheme of a computing system, and more particularly, to a synchronization clocking scheme for a small scalable multi-processor system to facilitate symmetric multi-processing (SMP) across different bootable domains.

BACKGROUND

Generally, every independent computing system has a dedicated clocking scheme. For a blade or clustering system with plural mother boards, every mother board is implemented as an independent computing system and each has its own system clock. Commonly an independent computing system may be considered as a bootable domain since it includes certain dedicated hardware/software/firmware for initializing or booting up the system. If a bootable domain includes multiple processors that performance symmetric multi-processing (SMP), the bootable domain is an independent SMP domain as well.

FIG. 1 shows a typical implementation of a small scale system that has two independent SMP domains A, B operating as two independent computing systems. The two domains A, B are identical without interconnections between two groups of processors, CPU A0, A1, A2, A3 and CPU B0, B1, B2, B3. Basically the clock sources A6, B6 are clock generators, each outputting a base clock for PLL (phase-locked loop) A5/B5. The PLLs A5, B5 will generate N times faster clock based on the base clock. And each of the clock buffers A4, B4 is a buffer to make some duplicated copies for the two groups of processors, namely CPU A0, A1, A2, A3 and CPU B0, B1, B2, B3.

Since in such system the two SMP domains A, B are completely independent without synchronized clock across both the domains A, B, the system configuration is fixed by the design. To facilitate flexible SMP (symmetric multi-processing), the system will require specific means to synchronize the system clock or share clock distribution. In other words, the domains will not only need to be bootable with their own clocks respectively, but also bootable as a whole with a synchronized clock, which is still not provided in the prior art.

SUMMARY

Accordingly, the present invention provides a synchronization clocking scheme for a small scalable multi-processor system to facilitate flexible SMP configuration over different SMP domains.

In an embodiment of the present invention, a clocking scheme for applying to a multi-processor system mainly includes a clock source, a SPLL, a clock buffer on each of the SMP domains of the multi-processor system. The clock source is for generating a base clock and sending to each of the SMP domains. The SPLL is for receiving the base clocks from each of the SMP domains, and for selecting one of the base clocks according to a select signal, and eventually generates an N-times faster clock. The clock buffer is for providing duplicated copies of the N-times faster clock to plural processors located at the same SMP domain. One or more of the base clocks is sent through a self-clock path to the SPLL on the same SMP domain, as well as through a distribution-clock path to another of the SPLL on another of the SMP domains. To provide similar electrical characteristics and balance the skew or propagation delay, the self-clock path and the distribution-clock path have equal lengths.

In an embodiment of the present invention, each of the self-clock path and the distribution-clock path includes a start segment on the SMP domain of start, an interconnection segment on the interconnection board, and an end segment on the SMP domain of destination. The self-clock path and the distribution-clock path from the same clock source may have equal lengths at the start segment, interconnection segment and end segment. In certain cases, all the self-clock paths and the distribution-clock paths in the multi-processor system includes equal lengths at the start segment, interconnection segment and end segment.

In an embodiment of the present invention, the select signal is generated by a glue logic located on each of the SMP domains or the interconnection board. The glue logic generates the select signal according to a configuration signal that defines the SMP configuration of the multi-processor system. The interconnection board may connect with two or more of the SMP domains through two or more identical connectors. Each of the distribution-clock path and the self-clock path passes through the two connectors or through the same connector twice.

In an embodiment of the present invention, the clocking scheme further includes a multiplexer located on one or more of the SMP domains for sending the base clock through the distribution-clock path and the self-clock path.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
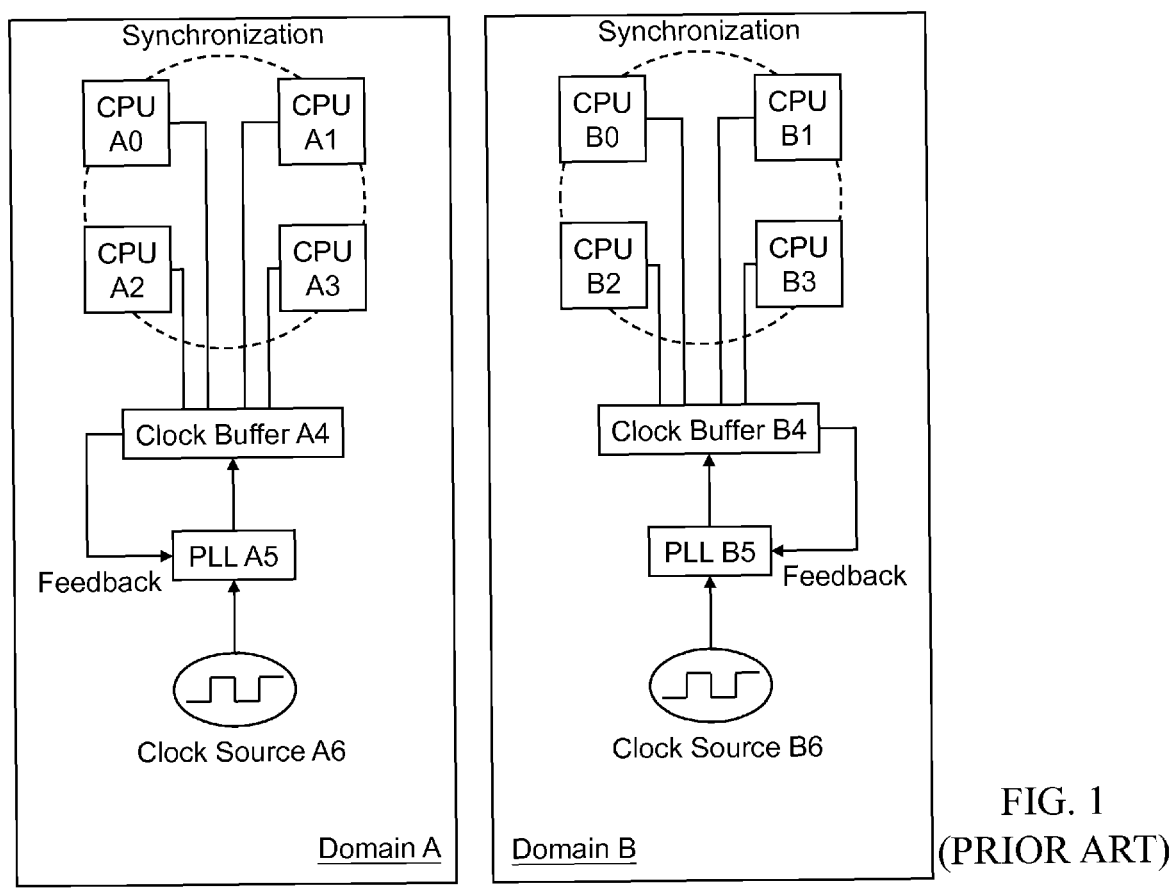
FIG. 1 is an explanatory block diagram of a multi-processor system in the prior art, showing two independent clocking schemes in two different bootable domains.
Figure 2:
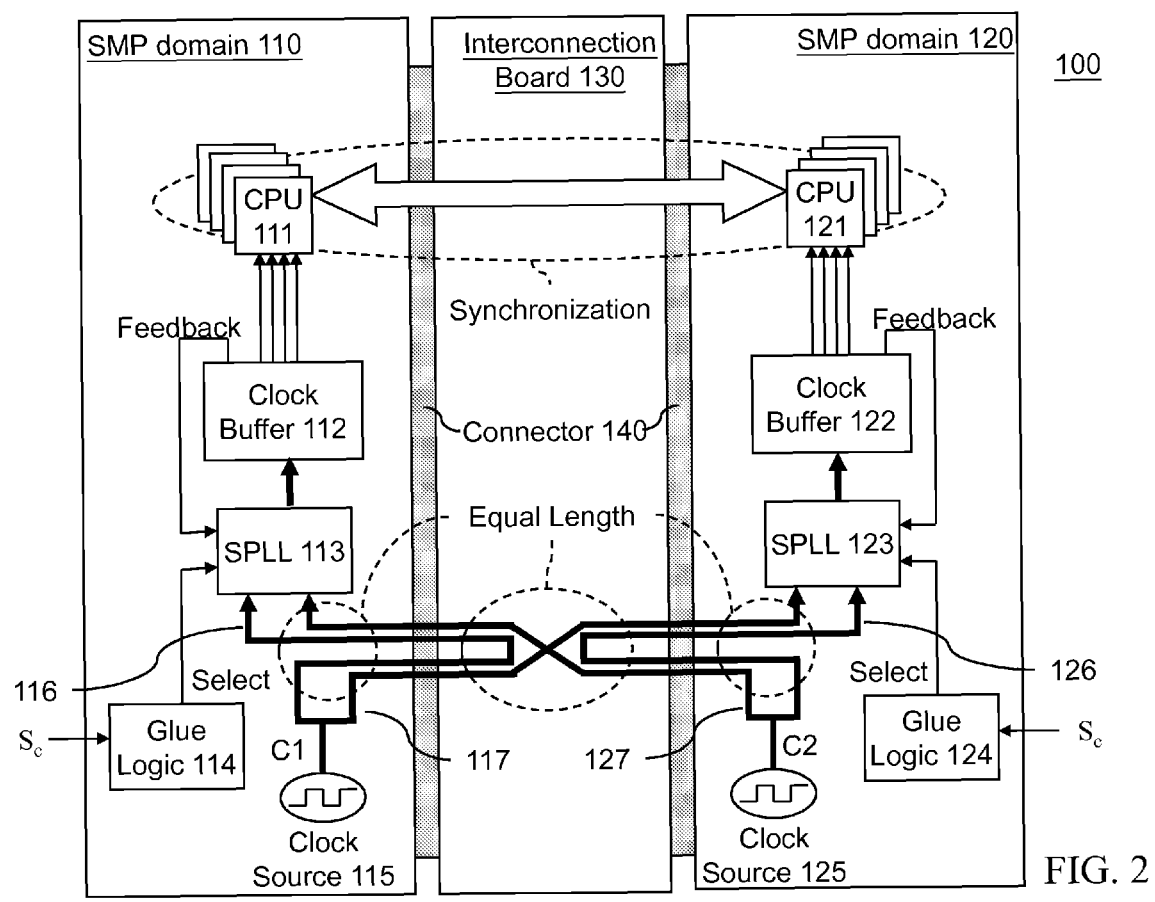
FIG. 2 is an explanatory block diagram of a multi-processor system according to an embodiment of the present invention.

Please refer to FIG. 2. A multi-processor system 100 mainly includes two SMP (Symmetric Multi-Processing) domains 110, 120 and an interconnection board 130.

The SMP domains 110/120 mainly include four processors CPU111/CPU121 that performance independent symmetric multi-processing, a clocking scheme (not marked) and other essential electrical components (omitted). Each of the SMP domains 110, 120 includes a boot image (not shown) imbedded on a memory device (not shown) to implement BIOS (Basic Input Output System). One practical way for the SMP domain in the present invention is to implement on a CPU board or a mother board.

The interconnection board 130 connects with both the first and second SMP boards 110, 120 through two identical connectors 140, thereby providing communications between the two groups of processors CPU111 and CPU121. A practically interconnection board may be interposer board, backplane, mid-plane, center-plane or other interconnecting board through connector(s).

The clocking scheme includes two clock buffers 112, 122, two SPLLs (Select Phase-Locked Loops) 113, 123, two glue logics 114, 124, two clock sources 115, 125, a first-first self-clock path 116 and a second-second self-clock path 126 located on the first or second SMP domains 110, 120 respectively. The clocking scheme also includes a first-second distribution-clock path 117 and a second-first distribution-clock path 127 passing across the interconnection board 130 between the first and second SMP boards 110, 120.

The clock sources 112, 122 are basically clock generators located respectively on each of the first and second SMP domains 110, 120. Each of the clock sources 112, 122 generates a base clock C1/C2 and sends to each of the first and second SMP domains 110, 120. Through the first-first self-clock path 116 and the second-second self-clock path 126 the base clocks C1, C2 are sent respectively to the self SMP domains 110, 120. Along the first-second distribution-clock path 117, the base clock C1 is also sent from the first SMP domain 110 to the second SMP domain 120 through the interconnection board 130. Similarly, along the second-first distribution-clock path 127 the base clock C2 is sent from the second SMP domain 120 to the first SMP domain 110 through the interconnection board 130.

Namely, each of the base clocks C1, C2 is sent to each of all the SMP domains 110, 120, including the self SMP domain and the other SMP domain to share clock distribution.

The SPLLs 113, 123 are so-called select PLLs (Phase-Locked Loops), located respectively on the first and second SMP domains 110, 120. Each of the SPLLs 113, 123 receives all the base clocks C1, C2 from each of the SMP domains, and selects one of the base clocks C1, C2 according to a select signal from each of the glue logic 114, 124. The selected base clock C1 or C2 will be used to generate an N-times faster clock.

The glue logics 114, 124 are logics to control clock selection at the SPLLs 113, 123 based on overall SMP configuration. Each of the glue logics 114, 124 sends a select signal to the self SPLL 113/123 (the one in the same SMP domain) according to a configuration signal $S_c$. In a system that support flexible SMP configuration, the configuration signal $S_c$ is required to define a desired SMP configuration. A hardwired signals defined by DIP (dual in-line package)-switches or pull-up/down resistors, or configuration code defined by system management firmware/software, may be used to generate the configuration signal $S_c$. In certain case an integrated may be used to provide the same functions as all of the glue logics 114, 124. Besides, the glue logic may locate on either one of the SMP domains, the interconnection board or other switch board. Under specific conditions, the same glue logic may even be used to control all bootable domains. Please refer to the following patent applications for more details related to system changes on SMP configuration: U.S. Provisional Patent Application No. 60/822,397 on Aug. 21, 2006, and its non-Provisional application Ser. No. 11/539,590 on Oct. 6, 2006, with title of "System and Method for Flexible SMP Configuration".

The clock buffers 112, 122 are located respectively on each of the SMP domains, providing duplicated copies of the N-times faster clock to the self processors (those located at the same SMP domain) CPU111 or CPU121. Feedbacks may be sent from the clock buffers 112, 122 back to the SPLLs 113, 123. The SPLL and the clock buffer in the same SMP domain could be combined as one device; this depends on actual device selection.

For each of the SMP domains according to the present invention, every SMP domain has a dedicated sub-clocking scheme. In FIG. 2 that means the clock buffer 112, the SPLL 113, the glue logic 114 the clock source 115 and the first-first self-clock path 116 are for the first SMP domain 110; on the other hand, the clock buffer 122, the SPLL 123, the glue logic 124 the clock source 125 and the second-second distribution-clock path 127 are for the second SMP domain 120. When the two SMP domains 110, 120 boots up and operate independently, each dedicated sub-clocking scheme will be adequate for the SMP domain it belongs to.

If the two SMP domains 110, 120 need to boot up and operate as one integrated SMP system, the first-second distribution-clock path 117 and the second distribution-clock path 127 will provide two options from the clock sources 115, 125. The multi-processor system may use the configuration signals $S_c$ to control the glue logics 114, 124 and send corresponding select signals, then make both the two SPLLs 113, 123 select the base clock C1 as the only active clock for both the first and second SMP domains 110, 120. Then the base clock C2 becomes a backup clock if somehow the base clock C1 fails.

The first-first and first-second self-clock paths 116, 117, the second-second and second-first distribution-clock paths 126, 127 are basically electrical traces. To allow balancing the skew or propagation delay between two SMP domains, the active clock will need to be sent through the clock paths that have similar electrical characteristics, including the same connector(s).

Figure 3:
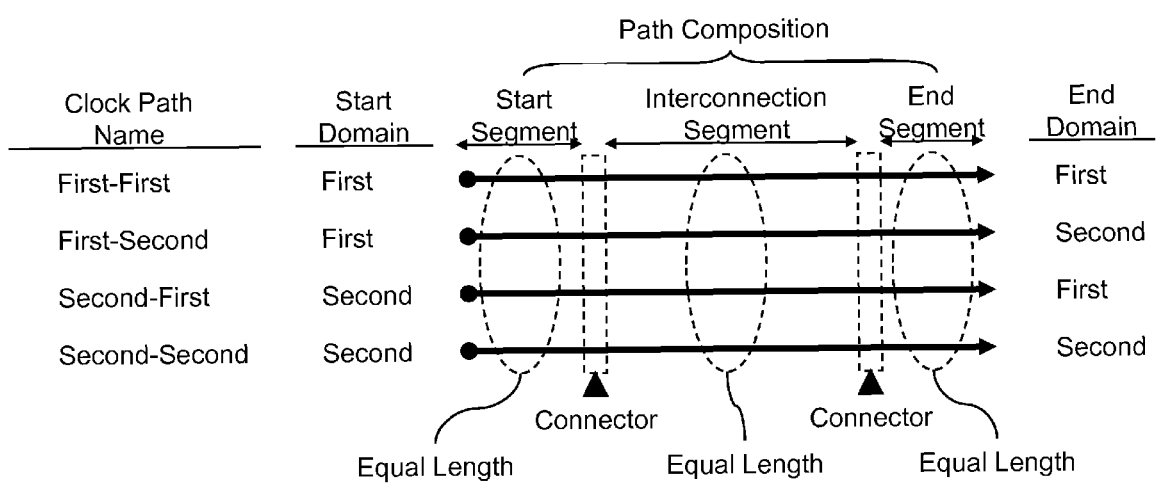
FIG. 3 is an explanatory diagram of the clock paths in FIG. 2.

Please refer to FIG. 3 as well as FIG. 2. Each of the first-first and first-second self-clock paths 116, 117, the second-second and second-first distribution-clock paths 126, 127 may be divided into three segments: a start segment, an interconnection segment and an end segment. Every base clock basically passes through these three segments and two connectors (or twice the same connector): from the start segment, the (first time) connector, the interconnection segment, the (second time) connector and the end segment to arrive the SPLL. The start segment is the trace segment located on the start SMP domain, connecting the clock source and the connector; the interconnection segment is the trace segment located on the interconnection board, connecting between two connectors; and the end segment is the trace segment located on the end SMP domain.

If the base clock C1 is the selected one, the first-first self-clock path 116 and the first-second path 117 need to have equal lengths at each of the start, interconnection and end segments to provide the similar electrical characteristics and balance the skew or propagation delay. If the base clock C2 is not used as a backup clock, the second-first clock path 127 is actually not essential. On the contrary, the second-second self-clock path 126 and the second-first clock path 127 may also have equal lengths at each of the start, interconnection and end segments to provide the similar electrical characteristics and balance the skew or propagation delay. Certainly, one of optimum configurations is to make the first-first, first-second, second-second and second-first clock paths 116, 117, 126, 127 have equal lengths at each of the start, interconnection and end segments, as shown in FIG. 2. The layout including lengths, position, path shapes and etc. for each of the clock paths in the drawings of the present invention is only for clear explanation and might not meet the actual requirements of equal lengths.

Under the conditions provided above, the clock paths from the same clock source will have the minimum process variation. Connectors may be test first to choose those have exactly the same electrical characteristics. With this new clocking scheme, without a lot of electrical characteristic data, the design is easy to manage the clock skew and propagation delay. Therefore a larger SMP configuration across different domains may eventually been achieved. The present invention also provides flexibility for the interconnection board design including connector selection, since the propagation delay and skew number is independent of the bootable SMP domain or CPU board design.

Figure 4:
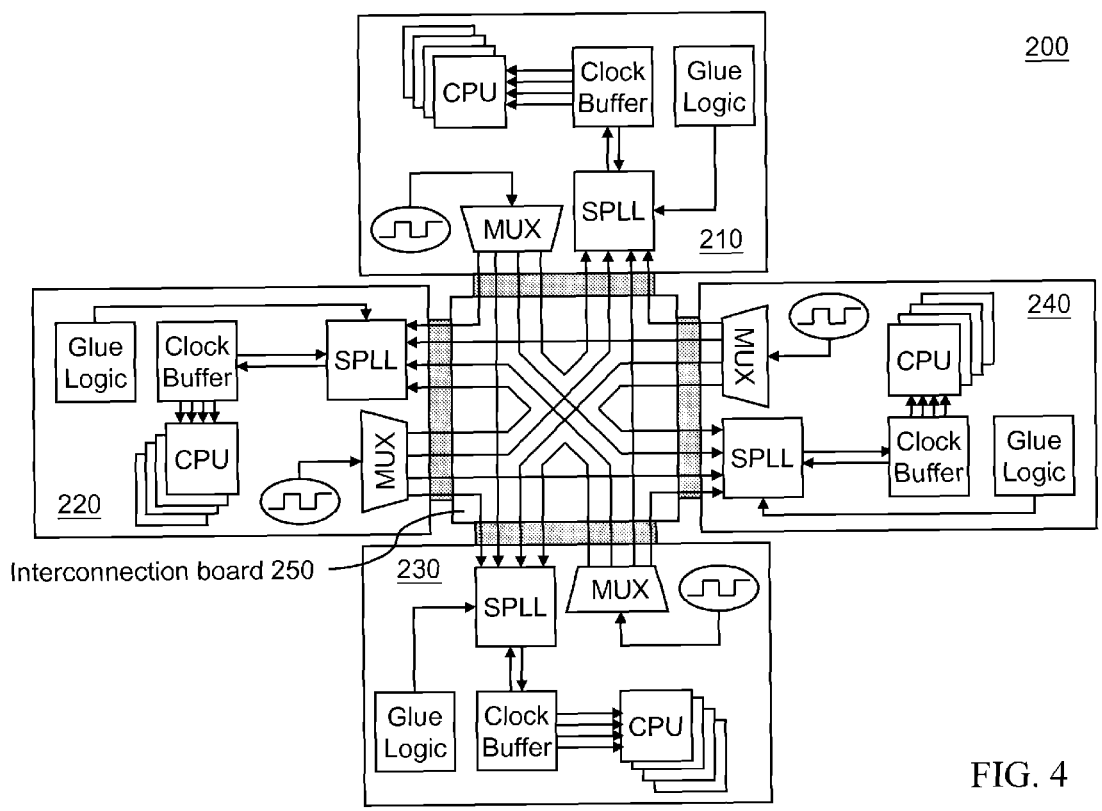
FIG. 4 is an explanatory block diagram of a multi-processor system according to another embodiment of the present invention.
Figure 5:
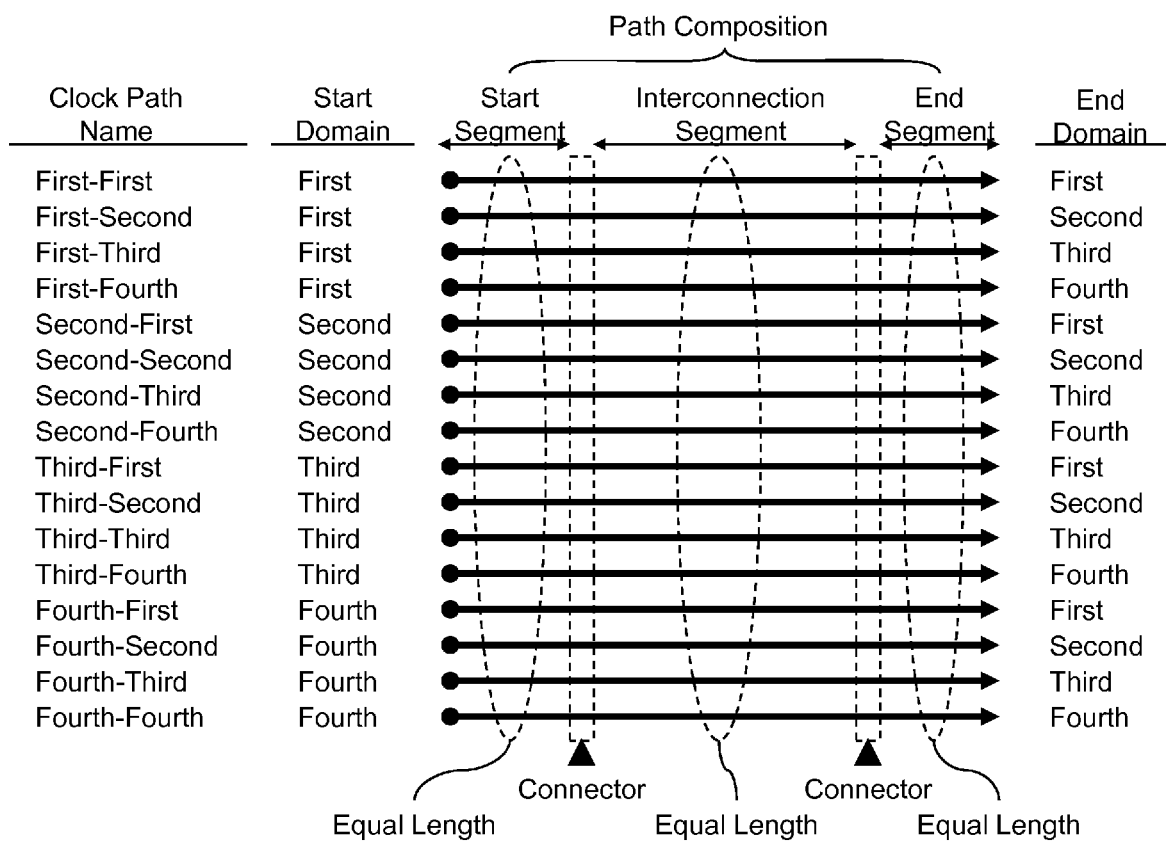
FIG. 5 is an explanatory diagram of the clock paths in FIG. 4.

Please refer to FIG. 4 and FIG. 5. The multi-processor system in the embodiment includes four bootable SMP domains 210, 220, 230, 240, all connection with an interconnection board 250. A multiplexer MUX is used on each of the SMP domains 210, 220, 230, 240 to send the self base clock (from the clock source in the same SMP domain) through one self-clock path and three distribution-clock paths. Similar to the former embodiment in FIGS. 2 and 3, from the multiplexer MUX the self-clock path will have three segments as well as the other three distribution-clock paths. If all sixteen clock paths in the whole system, including four self-clock paths and twelve distribution-clock paths, have equal lengths at the start, interconnection and end segments, that means there are four base clocks available to be selected as one main system clock and three backup clocks. On the other hand, if not every clock is required to share, only the group of the clock paths from the same clock source need to have said features of equal lengths.

In brief, the present invention discloses a clocking scheme for applying to a multi-processor system having two or more independent SMP (Symmetric Multi-Processing) domains and an interconnection board connecting with any two of the SMP domains. The clocking scheme mainly includes a clock source, a SPLL, a clock buffer on each of the SMP domains. The clock source is for generating a base clock and sending to each of the SMP domains. The SPLL is for receiving the base clocks from each of the SMP domains, and for selecting one of the base clocks according to a select signal, and eventually generates an N-times faster clock. The clock buffer is for providing duplicated copies of the N-times faster clock to plural processors located at the same SMP domain. One or more of the base clocks is sent through a self-clock path to the SPLL on the same SMP domain, as well as through a distribution-clock path to another of the SPLL on another of the SMP domains. To provide the similar electrical characteristics and balance the skew or propagation delay, the self-clock path and the distribution-clock path have equal lengths; one optimum approach is to have equal lengths at the start segment, the interconnection segment and the end segment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clocking scheme for a multi-processor system, the multi-processor system having at least two independent SMP (Symmetric Multi-Processing) domains and an interconnection board connecting with any two of the SMP domains, the clocking scheme comprising:
   a clock source located on each of the SMP domains, generating a base clock and sending to each of the SMP domains;
   a SPLL (Select Phase-Locked Loop) located on each of the SMP domains, receiving at least one of the base clocks from at least one of the SMP domains, and selecting one of the base clocks according to a select signal to generate an N-times faster clock;
   a clock buffer located on each of the SMP domains, providing duplicated copies of the N-times faster clock to a plurality of processors located at the same SMP domain; and a self-clock path sending the base clock to the SPLL on the same SMP domain;
   wherein one or more of the base clocks can be sent through a distribution-clock path to another of the SPLLs on another of the SMP domains creating first and second distribution clock paths, the first and the second distribution-clock paths and the self-clock path having equal lengths, and configured such that when the SMP domains are booted up as a single integrated system, the SPLLs of the SMP domains each select a single one of the base clocks according to the select signal to generate a synchronized N-times faster clock.

2. The clocking scheme of claim 1, wherein each of the self-clock path and the distribution-clock path comprises a start segment on the SMP domain of start, an interconnection segment on the interconnection board, and an end segment on the SMP domain of destination.

3. The clocking scheme of claim 2, wherein the self-clock path and the distribution-clock path from the same clock source comprises equal lengths at the start segment, interconnection segment and end segment.

4. The clocking scheme of claim 2, wherein all the self-clock paths and the distribution-clock paths in the multi-processor system comprises equal lengths at the start segment, interconnection segment and end segment.

5. The clocking scheme of claim 1, wherein the select signal is generated by a glue logic.

6. The clocking scheme of claim 5, wherein the glue logic is located on each of the SMP domains or the interconnection board.

7. The clocking scheme of claim 5, wherein the glue logic generates the select signal according to a configuration signal that defines the SMP configuration of the multi-processor system.

8. The clocking scheme of claim 1, wherein the interconnection board connects with at least two of the SMP domains through at least two identical connectors, each of the distribution-clock path and the self-clock path passing through the two connectors or through the same connector twice.

9. The clocking scheme of claim 1 further comprising a multiplexer located on at least one of the SMP domains for sending the base clock through the distribution-clock path and the self-clock path.

10. A multi-processor system comprising:
    at least two independent SMP (Symmetric Multi-Processing) domains;

an interconnection board connecting with any two of the SMP domains; and a clocking scheme for clocking synchronization across the SMP domains, comprising;
a clock source located on each of the SMP domains, generating a base clock and sending to each of the SMP domains;
a SPLL (Select Phase-Locked Loop) located on each of the SMP domains, receiving at least one of the base clocks from at least one of the SMP domains, and selecting one of the base clocks according to a select signal to generate an N-times faster clock; and
a clock buffer located on each of the SMP domains, providing duplicated copies of the N-times faster clock to a plurality of processors located at the same SMP domain; and
a self-clock path sending the base clock to the SPLL on the same SMP domain;
wherein one or more of the base clocks can be sent through a distribution-clock path to another of the SPLLs on another of the SMP domains creating first and second distribution clock paths, the first and the second distribution-clock paths and the self-clock path having equal lengths, and configured such that when the SMP domains are booted up as a single integrated system, the SPLLs of the SMP domains each select a single one of the base clocks according to the select signal to generate a synchronized N-times faster clock.

11. The multi-processor system of claim 10, wherein each of the self-clock path and the distribution-clock path comprises a start segment on the SMP domain of start, an interconnection segment on the interconnection board, and an end segment on the SMP domain of destination.

12. The multi-processor system of claim 11, wherein the self-clock path and the distribution-clock path from the same clock source comprises equal lengths at the start segment, interconnection segment and end segment.

13. The multi-processor system of claim 11, wherein all the self-clock paths and the distribution-clock paths in the multi-processor system comprises equal lengths at the start segment, interconnection segment and end segment.

14. The multi-processor system of claim 10, wherein the select signal is generated by a glue logic.

15. The multi-processor system of claim 14, wherein the glue logic is located on each of the SMP domains or the interconnection board.

16. The multi-processor system of claim 14, wherein the glue logic generates the select signal according to a configuration signal that defines the SMP configuration of the multi-processor system.

17. The multi-processor system of claim 10, wherein the interconnection board connects with at least two of the SMP domains through at least two identical connectors, each of the distribution-clock path and the self-clock path passing through the two connectors or through the same connector twice.

18. The multi-processor system of claim 10 further comprising a multiplexer located on at least one of the SMP domains for sending the base clock through the distribution-clock path and the self-clock path.

19. A multi-processor system comprising:
at least a first and a second independent SMP (Symmetric Multi-Processing) domain configured such that the first and second SMP domains may be selectively booted up independently or as a single integrated system, the first and second SMP domains each comprising a plurality of processors performing symmetric multi-processing and a corresponding dedicated sub-clocking scheme, each dedicated sub-clocking scheme comprising a clock source generating a base clock, a SPLL (Select Phase-Locked Loop) receiving the base clock and generating an N-times faster clock, a clock buffer providing duplicated copies of the N-times faster clock to the plurality of processors located on the corresponding SMP domain, and a self-clock path sending the base clock to the SPLL, configured such that when the first and second SMP domains are booted up independently, the first and second SMP domains are each operated according to its corresponding dedicated sub-clocking scheme; and
an interconnection board connecting the base clock of the first SMP domain to the SPLL of the second SMP domain through a first distribution-clock path, and connecting the base clock of the second SMP domain to the SPLL the first SMP domain through a second distribution-clock path, wherein the first distribution-clock path, the second distribution-clock path and the self-clock paths of the first and second SMP domains all have equal lengths;
configured such that when the first and second SMP domains are booted up as the single integrated system, the SPLLs of both the first and second SMP domains select a single one of the base clocks according to a corresponding select signal to generate a synchronized N-times faster clock.

20. The multi-processor system of claim 19, wherein the first and second SMP domains each comprise a glue logic, each glue logic configured to generate the corresponding select signal according to a configuration signal that defines the SMP configuration of the multi-processor system.

* * * * *